(12) United States Patent
Higgins et al.

(10) Patent No.: US 10,422,688 B2
(45) Date of Patent: Sep. 24, 2019

(54) SMART CABINET

(71) Applicant: eBay, Inc., San Jose, CA (US)

(72) Inventors: Krystal Rose Higgins, Campbell, CA (US); John Tapley, San Jose, CA (US); Eric J. Farraro, San Jose, CA (US)

(73) Assignee: eBay Inc., San Jose, CA (US)

( * ) Notice: Subject to any disclaimer, the term of this patent is extended or adjusted under 35 U.S.C. 154(b) by 197 days.

(21) Appl. No.: 15/479,012

(22) Filed: Apr. 4, 2017

(65) Prior Publication Data

US 2017/0205274 A1 Jul. 20, 2017

Related U.S. Application Data

(63) Continuation of application No. 13/800,368, filed on Mar. 13, 2013, now abandoned.

(60) Provisional application No. 61/763,811, filed on Feb. 12, 2013.

(51) Int. Cl.
| | |
|---|---|
| *G06Q 20/10* | (2012.01) |
| *G01G 19/414* | (2006.01) |
| *G06Q 10/08* | (2012.01) |
| *G07G 1/00* | (2006.01) |
| *G06Q 20/20* | (2012.01) |
| *G01G 23/37* | (2006.01) |
| *G06K 7/14* | (2006.01) |

(52) U.S. Cl.
CPC ..... *G01G 19/4146* (2013.01); *G01G 23/3728* (2013.01); *G06K 7/1413* (2013.01); *G06Q 10/087* (2013.01); *G06Q 20/208* (2013.01); *G07G 1/0072* (2013.01)

(58) Field of Classification Search
None
See application file for complete search history.

(56) References Cited

U.S. PATENT DOCUMENTS

| | | | |
|---|---|---|---|
| 7,180,014 B2 | 2/2007 | Farber et al. | |
| 2003/0078693 A1 | 4/2003 | Chavez | |
| 2003/0163354 A1* | 8/2003 | Shamoun | G06F 19/324 |
| | | | 705/3 |
| 2005/0184148 A1 | 8/2005 | Perlman | |
| 2007/0050271 A1 | 3/2007 | Ufford et al. | |

(Continued)

FOREIGN PATENT DOCUMENTS

WO WO-2005041080 A1 5/2005

OTHER PUBLICATIONS

"U.S. Appl. No. 13/800,368, Advisory Action dated May 3, 2016", 2 pgs.

(Continued)

*Primary Examiner* — Paul Danneman
(74) *Attorney, Agent, or Firm* — Schwegman Lundberg & Woessner, P.A.

(57) ABSTRACT

An apparatus is provided including a sensor configured to measure weight of a food item, a first interface configured to receive an identification of the food item, and a processor. The processor is configured to calculate how much of the food item has been consumed based on the measured weight, and to calculate, via a second interface in communication with a server, how many calories of the food item have been consumed based on the measured weight and the identification of the item and cause display of how many calories of the food item have been consumed to a first user.

20 Claims, 12 Drawing Sheets

(56) References Cited

U.S. PATENT DOCUMENTS

| | | | |
|---|---|---|---|
| 2009/0275002 A1* | 11/2009 | Hoggle | G09B 19/0092 |
| | | | 434/127 |
| 2012/0309307 A1 | 12/2012 | D'amico | |
| 2013/0138656 A1* | 5/2013 | Wheaton | G06F 17/30705 |
| | | | 707/740 |
| 2014/0006131 A1 | 1/2014 | Causey et al. | |
| 2014/0018636 A1* | 1/2014 | Contant | G06F 19/3475 |
| | | | 600/301 |
| 2014/0229343 A1 | 8/2014 | Higgins et al. | |

OTHER PUBLICATIONS

"U.S. Appl. No. 13/800,368, Examiner Interview Summary dated Sep. 22, 2015", 3 pgs.

"U.S. Appl. No. 13/800,368, Final Office Action dated Mar. 21, 2016", 18 pgs.

"U.S. Appl. No. 13/800,368, Final Office Action dated Nov. 13, 2015", 18 pgs.

"U.S. Appl. No. 13/800,368, Final Office Action dated Dec. 8, 2016", 22 pgs.

"U.S. Appl. No. 13/800,368, Non Final Office Action dated Jun. 16, 2016", 18 pgs.

"U.S. Appl. No. 13/800,368, Non Final Office Action dated Jul. 22, 2015", 11 pgs.

"U.S. Appl. No. 13/800,368, Response filed Apr. 15, 2016 to Final Office Action dated Mar. 21, 2016", 16 pgs.

"U.S. Appl. No. 13/800,368, Response filed Sep. 12, 2016 to Non Final Office Action dated Jun. 6, 2016", 12 pgs.

"U.S. Appl. No. 13/800,368, Response filed Oct. 6, 2015 to Non Final Office Action dated Jul. 22, 2015", 09 pgs.

* cited by examiner

SMART CABINET

CROSS-REFERENCE TO RELATED APPLICATIONS

This application is a continuation of U.S. patent application Ser. No. 13/800,368, filed on Mar. 13, 2013, which also claims the benefit of Provisional Patent Application Ser. No. 61/763,811, filed Feb. 12, 2013, the benefit of priority of each of which is claimed hereby, and each of which are incorporated by reference herein in its entirety.

TECHNICAL FIELD

This application relates generally to hybrid electronic/non-electronic components. More specifically, the application relates to a smart cabinet.

BACKGROUND

Every household contains at least one cabinet, whether it be a storage cabinet, pantry cabinet, kitchen cabinet, garage cabinet, medicine cabinet, or other type of cabinet. The goal of most of these cabinets is simply to store items. Users have varying degrees of reliability when it comes to tracking the items placed in these cabinets (to remember, for example, which item is in which cabinet, and the expiration dates of items in the cabinet) and to track the inventory levels of the cabinets (to remember, for example, to purchase more of an item when shopping).

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a smart cabinet is provided that tracks which items are placed within it, and as these items are used/consumed, tracks the amount of these items that remains. In some example embodiments, the system may then remind users when item inventory is low so that the user may reorder the item, or in some cases the system may reorder the item automatically.

Figure 1:
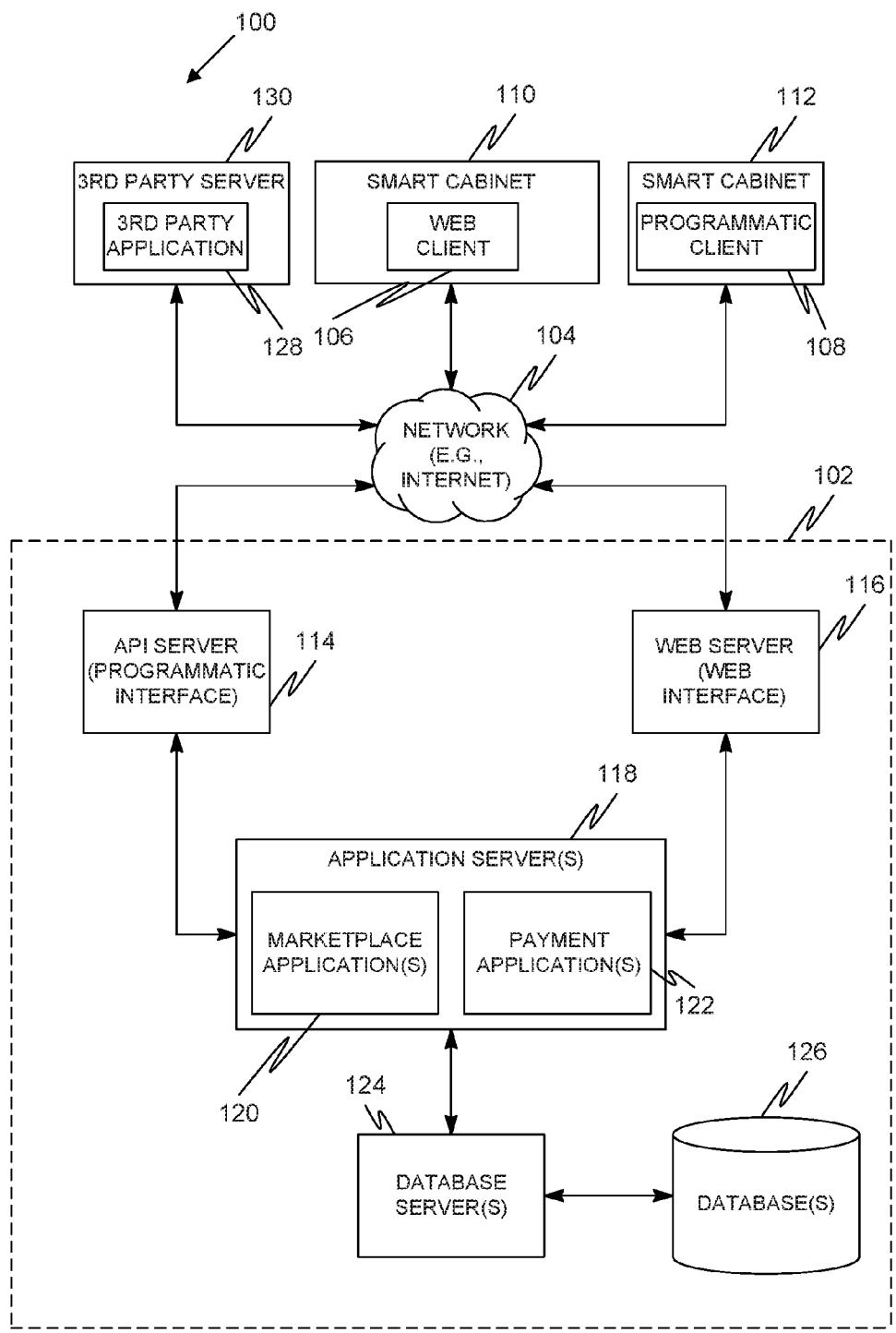
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or a wide area network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective smart cabinets 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
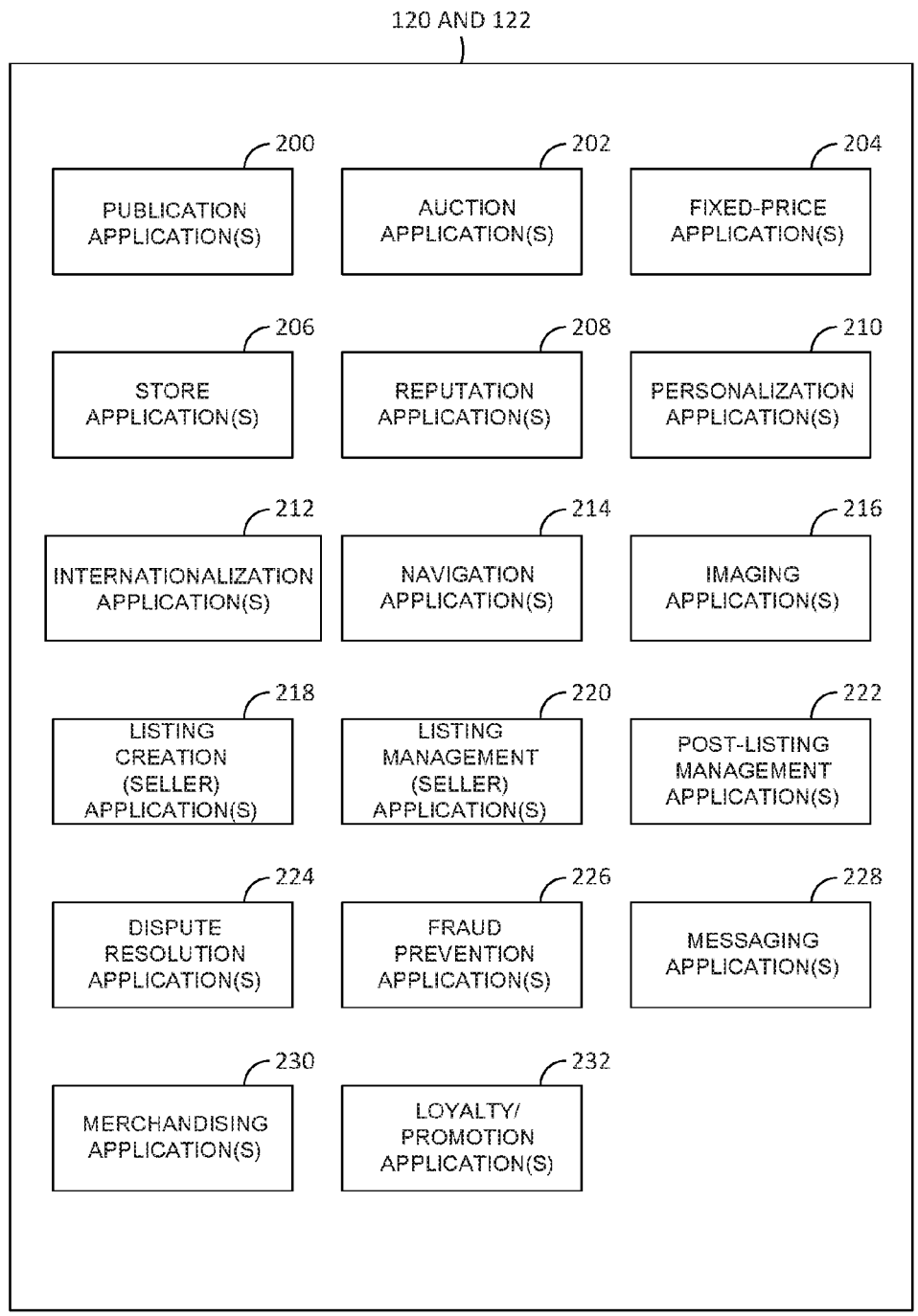
FIG. 2 is a block diagram illustrating marketplace and payment applications that, in one example embodiment, are provided as part of the networked system.

FIG. 2 is a block diagram illustrating marketplace and payment applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.)

to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VOIP)) messages via the wired (e.g., the Internet), plain old telephone service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
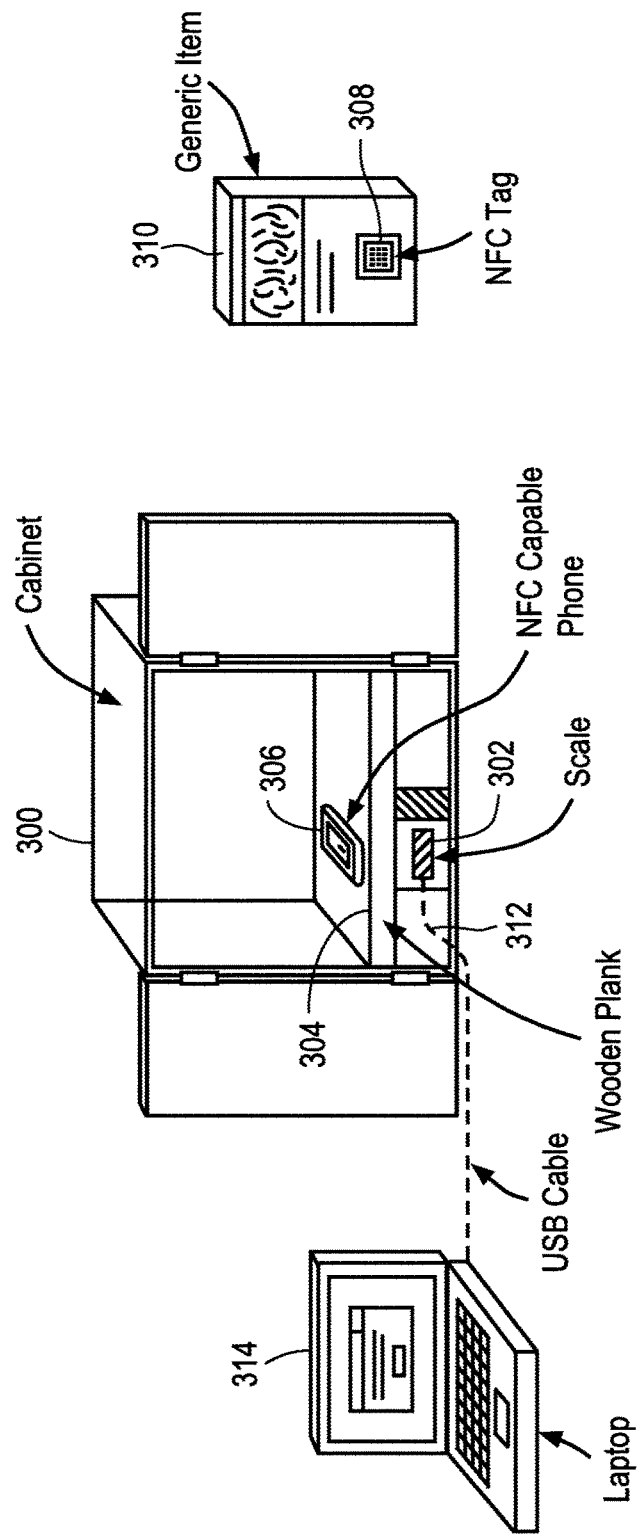
FIG. 3 is a schematic diagram illustrating a smart cabinet in accordance with an example embodiment.

FIG. 3 is a schematic diagram illustrating a smart cabinet in accordance with an example embodiment. The cabinet 300 may include a scale 302 located under a wooden plank 304. The wooden plank 304 may represent a bottom shelf of an interior of the cabinet 300. Also located in the cabinet 300 is a near-field communication (NFC) compatible smartphone 306. The NFC compatible smartphone 306 acts to automatically register new items placed in the smart cabinet 300. Each of these items may contain, for example, an NFC tag 308, such as depicted with respect to item 310. Upon placement of the item 310 inside the cabinet, the NFC compatible phone 306 can register that the item has been placed in the cabinet. If this is a new item, the NFC compatible phone 306 may then add the item 310 to an inventory list for this cabinet 300. Additionally, the scale 302 may be used to register the weight of the item, which would be the difference between the total weight registered by the scale 302 after the item 310 has been placed back on the wooden plank 304 and the total weight previously registered.

If the user has merely put back the item 310 after having removed it, the system may then utilize the scale 302 to determine how much the weight of the item has changed. The NFC compatible phone 306 may previously had recorded the weight of the item 310 before it was removed from the cabinet 300. As such, the NFC compatible phone 306 may then determine how much the weight of the item 310 has decreased since it was removed from the cabinet 300, which can be used to determine how much was consumed (or at least removed from the item 310).

It should be noted that while a NFC compatible smartphone 306 is described, the tracking and processing of item information for items 310 in the cabinet 300 could be performed by other electronic devices. Using an NFC compatible smartphone 306 allows for the items 310 to be tracked using NFC and also allows data from the cabinet 300 to be wirelessly transmitted by, for example, a cellular or data service, to a server for tracking. For example, the user could log in to a web page, which can access the server and provide details about the items 310 in the cabinet 300. Additionally, the NFC compatible smartphone 306 could also wirelessly transmit alerts, notifications, or other messages to the user or other entities (e.g., merchants) to perform various tasks described in more detail below. But there is no necessity that an NFC compatible smartphone 306 be used, and indeed many other types of devices could perform these or similar functions. For example, rather than an NFC component, a bar code scanner could be included to scan bar codes of items 310 as they are added to the cabinet 300.

Additionally pictured in a Universal Serial Bus (USB) port 312, which may be used to directly connect another device, such as a laptop computer 314, to the cabinet 300. This would allow for the direct access of data stored by the cabinet 300, and could also be used for configuration purposes.

It should be noted that the cabinet 300 depicted only has one shelf: wooden plank 304. If the cabinet 300 is large enough, there may be a desire to have additional shelves located higher than the wooden plank 304, which represents the bottom of the cabinet 300. In such instances, the measurement of items 310 may be accomplished in different ways. In one example embodiment, the scale 302 is placed underneath the entire cabinet 300, not just under a bottom shelf, although in many cabinets 300 the bottom shelf is the structural bottom of the cabinet 300 anyway. In another example embodiment, a separate scale 302 could be provided for each shelf, or even portions of shelves. In another example embodiment, the interior of the cabinet 300 may be designed so that the weight on higher shelves is transferred to the wooden plank 304, such as if vertical members connecting the upper shelves to the wooden plank are provided and used as shelf supports.

Figure 4:
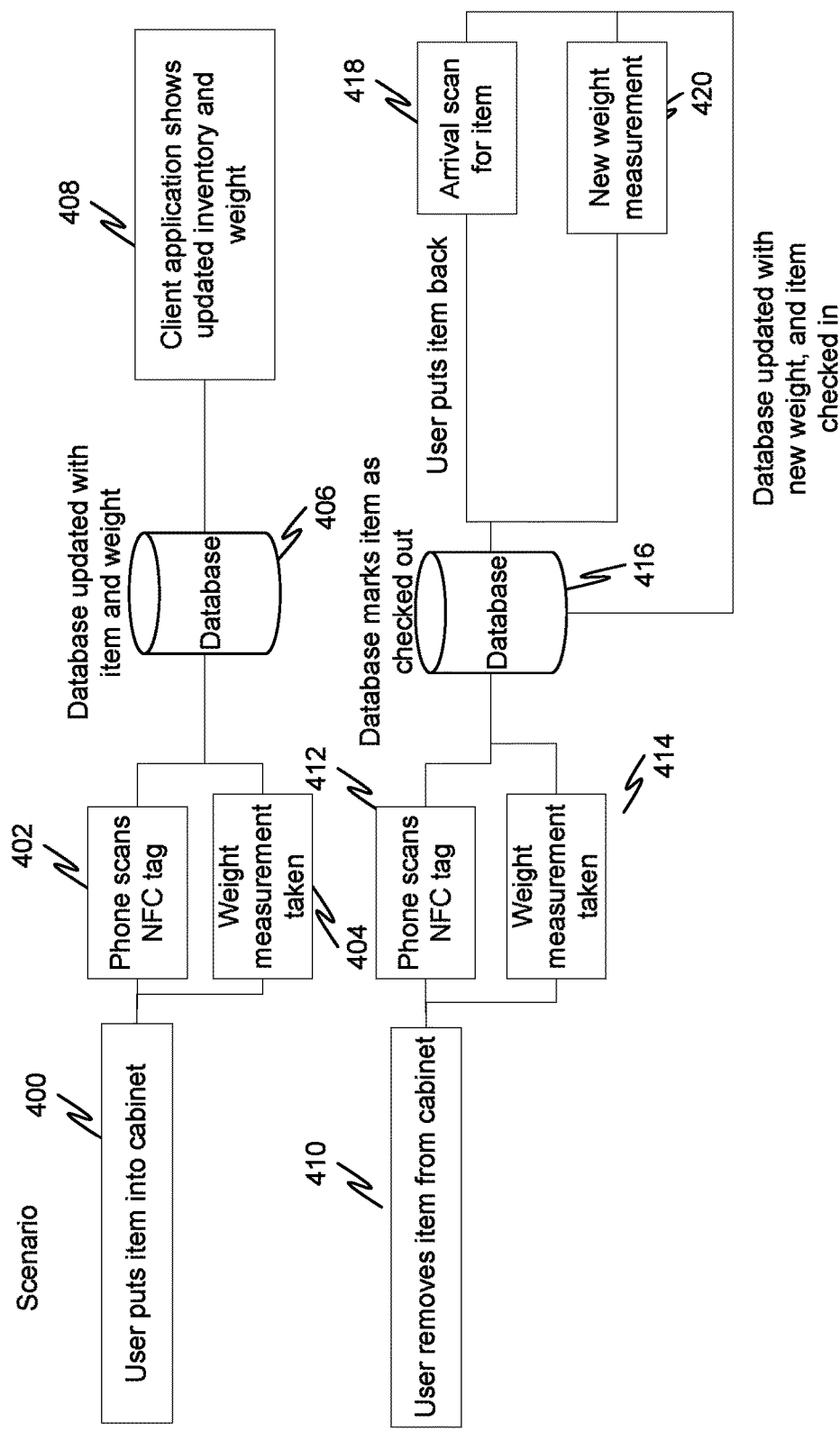
FIG. 4 is a diagram illustrating various scenarios in accordance with an example embodiment.

FIG. 4 is a diagram illustrating various scenarios in accordance with an example embodiment. In a first scenario 400, a user places an item into a cabinet. At 402, an NFC compatible phone scans an NFC tag on the item. At 404, a weight measurement of the cabinet is taken. A database 406 is then used to store the item and weight. This database 406 may be located at the smart cabinet itself, such as on the NFC compatible phone, or alternatively may be located on a separate server. A client application 408 can then use the updated inventory and weight to perform a number of different activities, described below.

In a second scenario, 410, a user removes an item from the cabinet. At 412, the NFC compatible phone scans an NFC tag of the item and at 414 a weight measurement of the cabinet is taken. The database 416 then marks the item as "checked out". When the user then puts the item back, at 418 an arrival scan is performed for the item, and at 420 the weight of the cabinet is measured again. The database 416 then updates its records with the new weight and marks the item as checked in.

Figure 5:
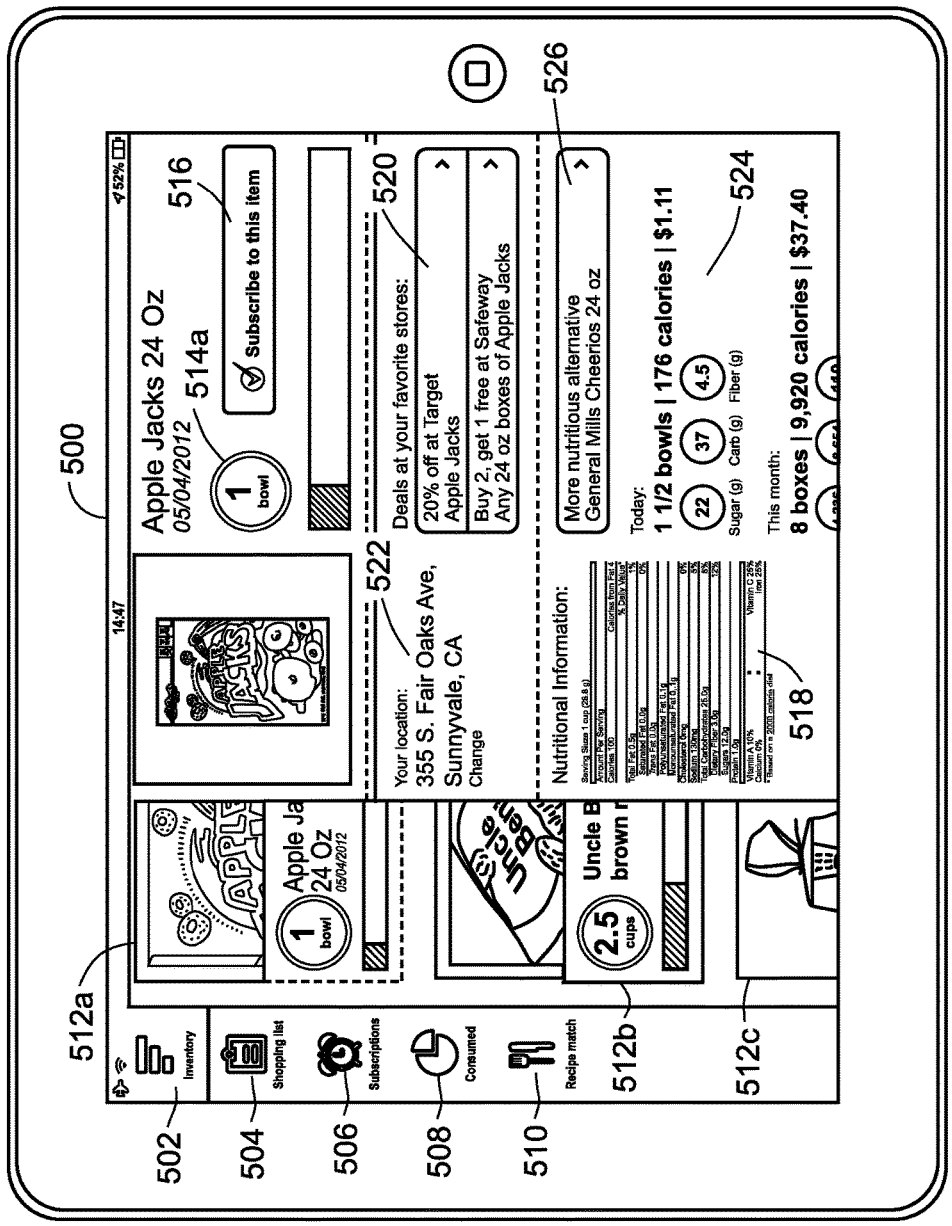
FIG. 5 is a screen capture illustrating a user interface in accordance with an example embodiment.

FIG. 5 is a screen capture illustrating a user interface in accordance with an example embodiment. The user interface 500 may include selectable buttons, including an inventory button 502, a shopping list button 504, a subscriptions button 506, a consumed button 508, and a recipe match button 510. In this screen capture, the user has selected the inventory button 502, which has brought up a selectable list of items 512a, 512b, 512c in the cabinet. Next to each item 512a, 512b, 512c is a quantity indicator 514a, which indicates the remaining quantity of the item 512a in the cabinet. Additionally, a subscription button 516 allows the user to easily subscribe to the item 512a. Subscribing to an item 512a allows the system to automatically order more of the item 512a, or automatically add the item 512a to a shopping list. This may be performed when the quantity of the item 512a is low (i.e., falls below a certain threshold, which may be either set by the system or by the user). Alternatively, the subscription may be based on time (e.g., reorder once a month).

In this screen capture, the user has selected a box of cereal 512a, which brings up an information window. The information window may provide various information obtained from outside sources, such as information servers. For example, nutritional information 518 may be provided, retrieved from a server linking the product identification (such as scanned NFC tag) to a product database. A discount area 520 may also be provided, which provides details on discounts available for the item 512a at, for example, stores local to the user's address 522 (online sources for the item 512a could also be listed).

A number of additional pieces of information could be provided to help people who are watching their food intake (e.g., dieters) or people watching their finances. This includes information on the amount consumed 524. This may be presented in various time periods, such as the amount consumed today and the amount consumed this month. Calories consumed can be calculated using the nutritional information 518 and displayed to the user in this area as well, which is helpful for dieters in seeing just how many calories they have consumed from their food. Additionally, cost estimates can also be provided which can help people who are watching their finances realize what exactly they are spending their money on. For example, in this screen capture, the user has consumed 1½ bowls of this cereal today, resulting in 176 calories and costing $1.11. This may not sounds like a lot, but for the month, the user has consumed 8 boxes of the cereal, resulting in 9920 calories and $37.50. A nutritious alternative area 526 may be provided, presenting a suggestion as to a different item that has fewer calories. After seeing how many total calories the user has consumed of this product a month, he or she may be more likely to select a nutritious alternative, especially if one is suggested.

Figure 6:
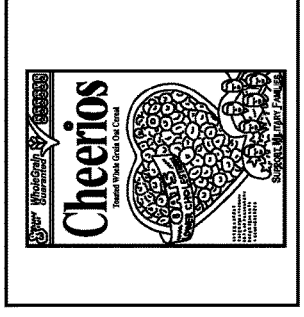
FIG. 6 is another screen capture illustrating the user interface in accordance with an example embodiment.

FIG. 6 is another screen capture illustrating the user interface in accordance with an example embodiment. Here, the user has selected a "more nutritious option" and been presented with user interface 600, which includes the original item 602a along with the more nutritious item 602b side-by-side. This allows the user to easily compare, for example, the nutritional information of both items 602a and 602b.

Figure 7:
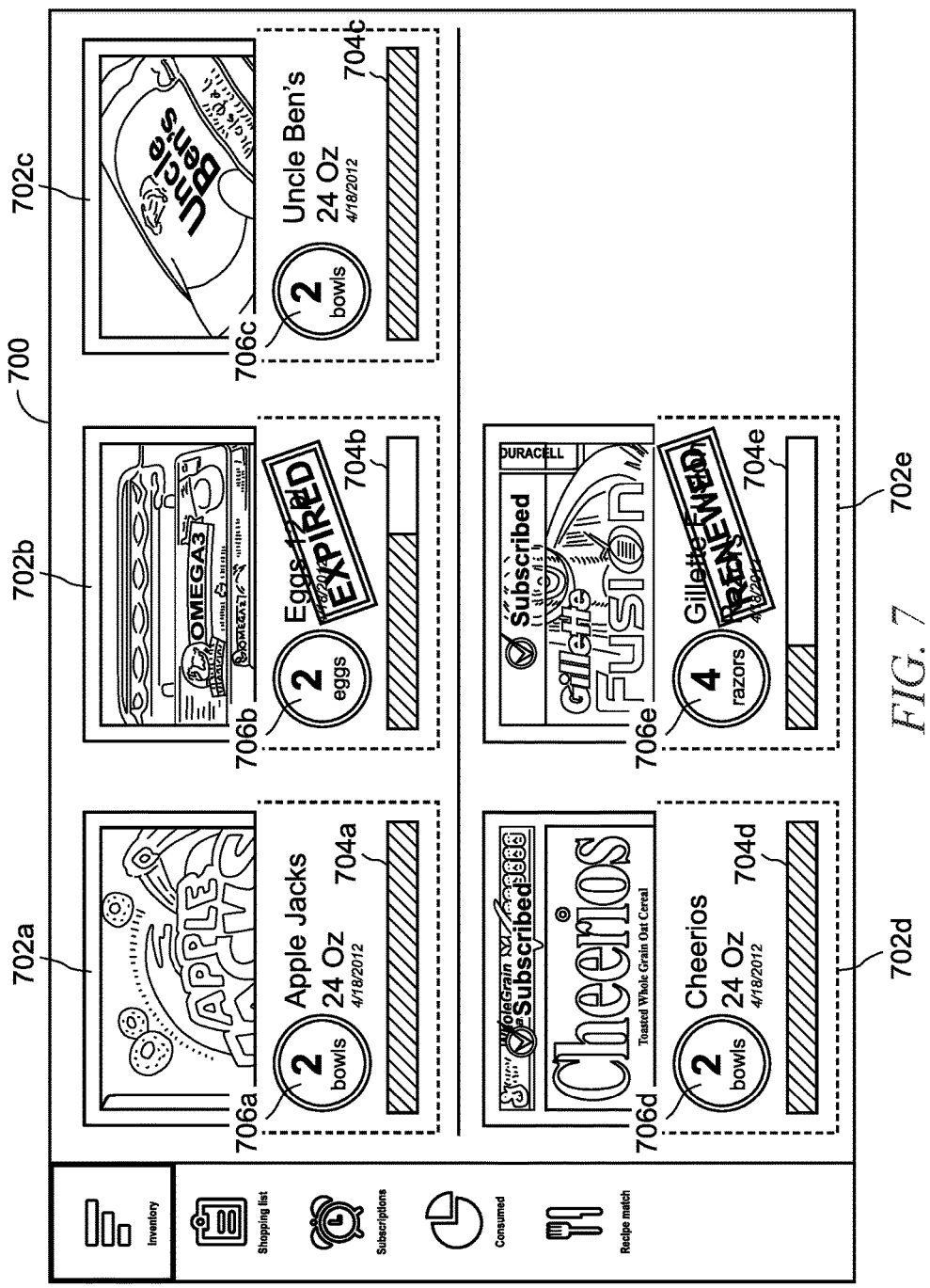
FIG. 7 is another screen capture illustrating the user interface in accordance with another example embodiment.

FIG. 7 is another screen capture illustrating the user interface in accordance with another example embodiment. Here, a different view is presented of inventory in the smart cabinet, with the user interface 700 depicting items 702a-702e side-by-side. A bar graph 704a-704e under each item indicates how much inventory is left, which is also indicated numerically at 706a-706e. Items 702a-702e whose quantities have fallen below a threshold may be renewed automatically (if a subscription is in place), such as with item 702e. Additionally, the expiration dates of the items 702a-702e may be tracked and displayed. Items 702a-702e that are past their expiration may be marked as such, such as with item 702b. The expiration dates may also be used to proactively order additional quantities, such as if the expiration date falls within the next few days, the system may initiate a message to reorder or pick up the item 702b.

Figure 8:
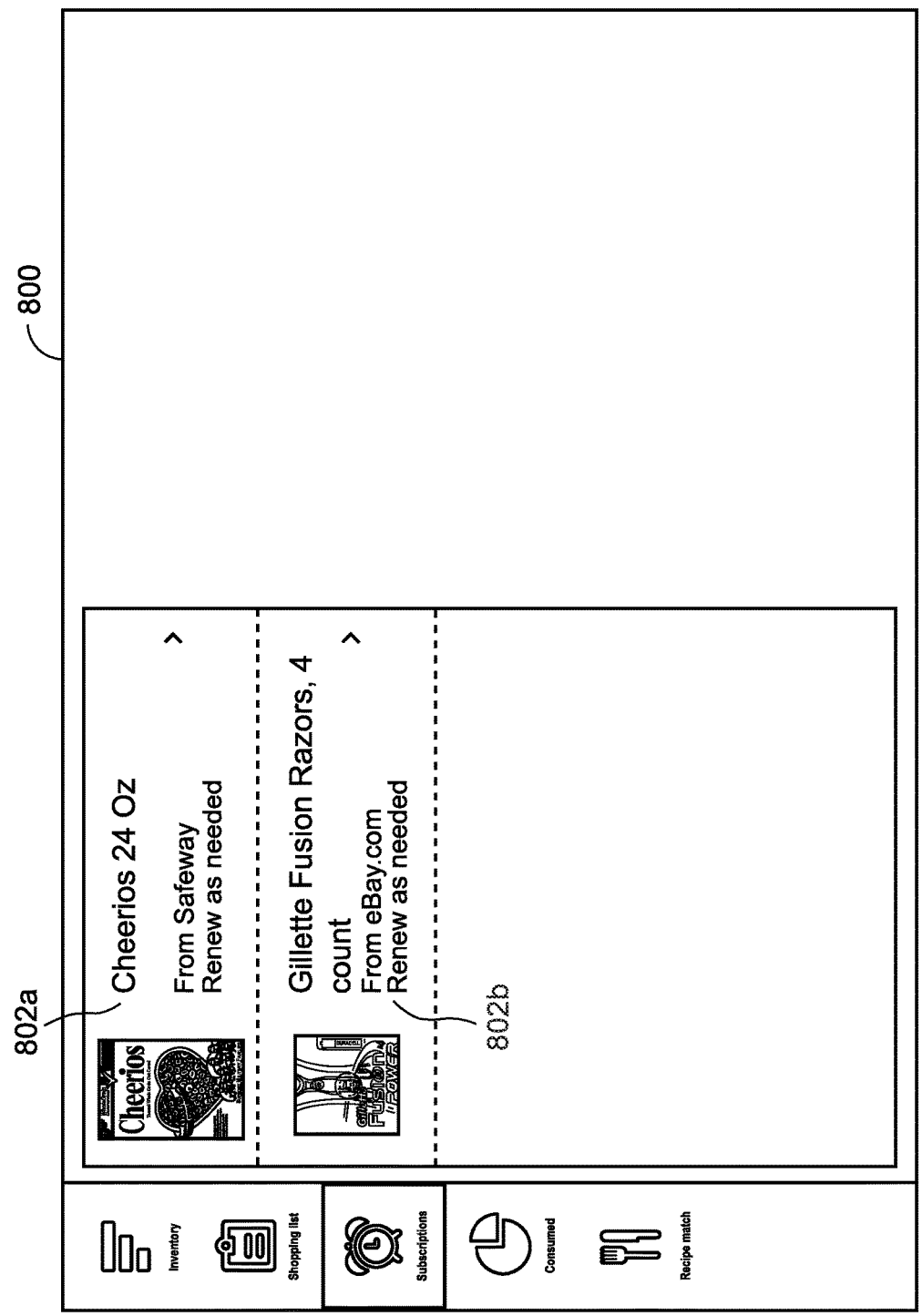
FIG. 8 is another screen capture illustrating the user interface in accordance with another example embodiment.

FIG. 8 is another screen capture illustrating the user interface in accordance with another example embodiment. Here, the user has selected a "subscriptions" option and been presented with user interface 800, depicts a listing of items 802a, 802b to which the user has subscribed. The subscription may indicate the merchant from which to reorder the item 802a or 802b, as well as an indication of how often to renew (e.g., as needed, once a week, once a month, etc.)

Figure 9:
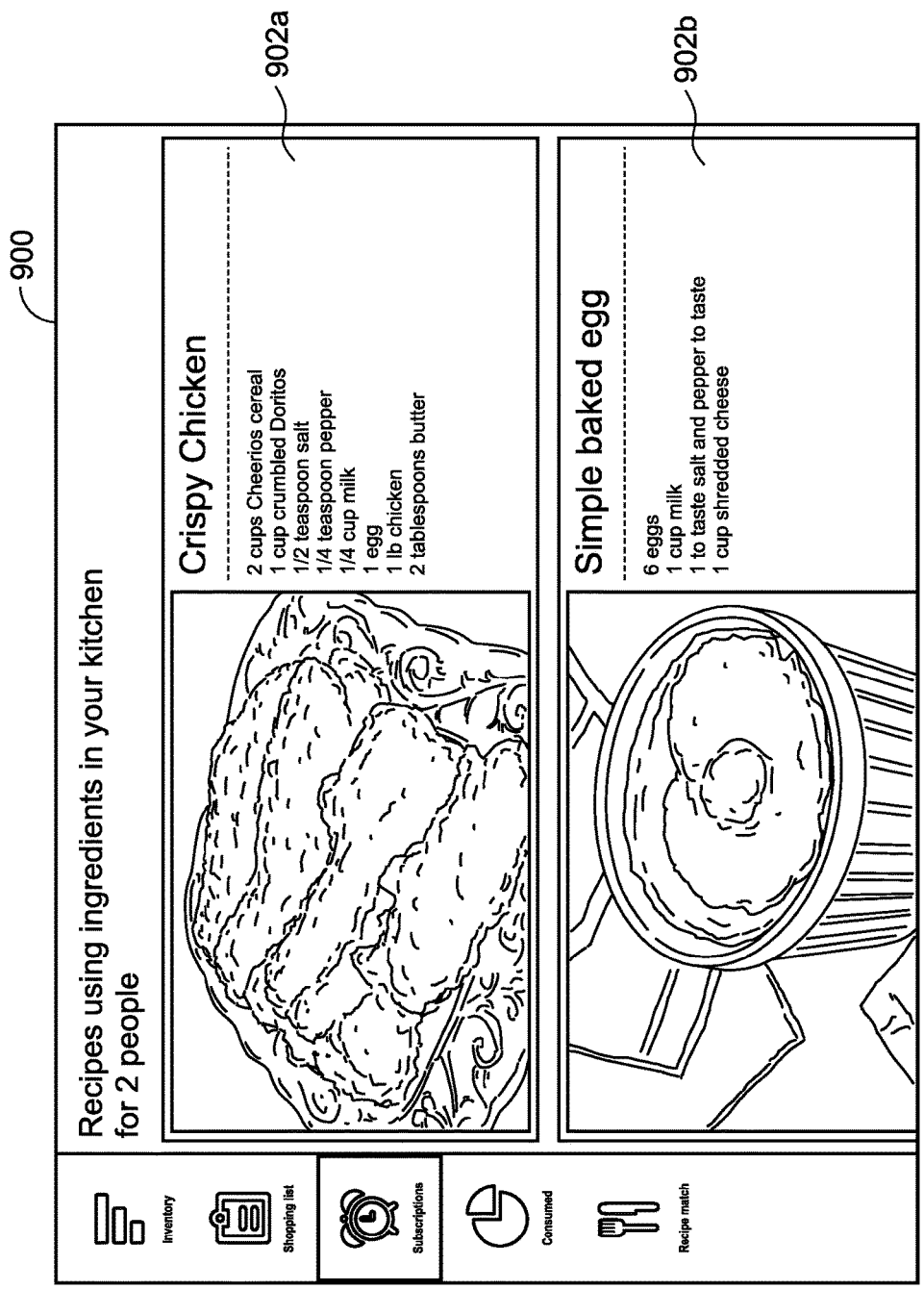
FIG. 9 is another screen capture illustrating the user interface in accordance with another example embodiment.

FIG. 9 is another screen capture illustrating the user interface in accordance with another example embodiment. Here, the user has selected a "recipe match" option and been presented with user interface 900, depicts a listing of recipes 902a, 902b that can be made with the items 702a-702e in the user's cabinet 300. In some embodiments, it is not necessary for all the ingredients to be owned by the user in order for the recipe to be shown. Recipes may be shown if the user owns the majority of the items 702a-702e in the recipe, or the major items to make the recipe.

It should be noted that while the above descriptions focus on a single smart cabinet, in some embodiments multiple smart cabinets may be networked and may exchange information. Thus, for the recipe match option described above, the system may know that, for example, some of the items 702a-702e for the recipe are located in a pantry cabinet and some are located in a refrigerator.

Figure 10:
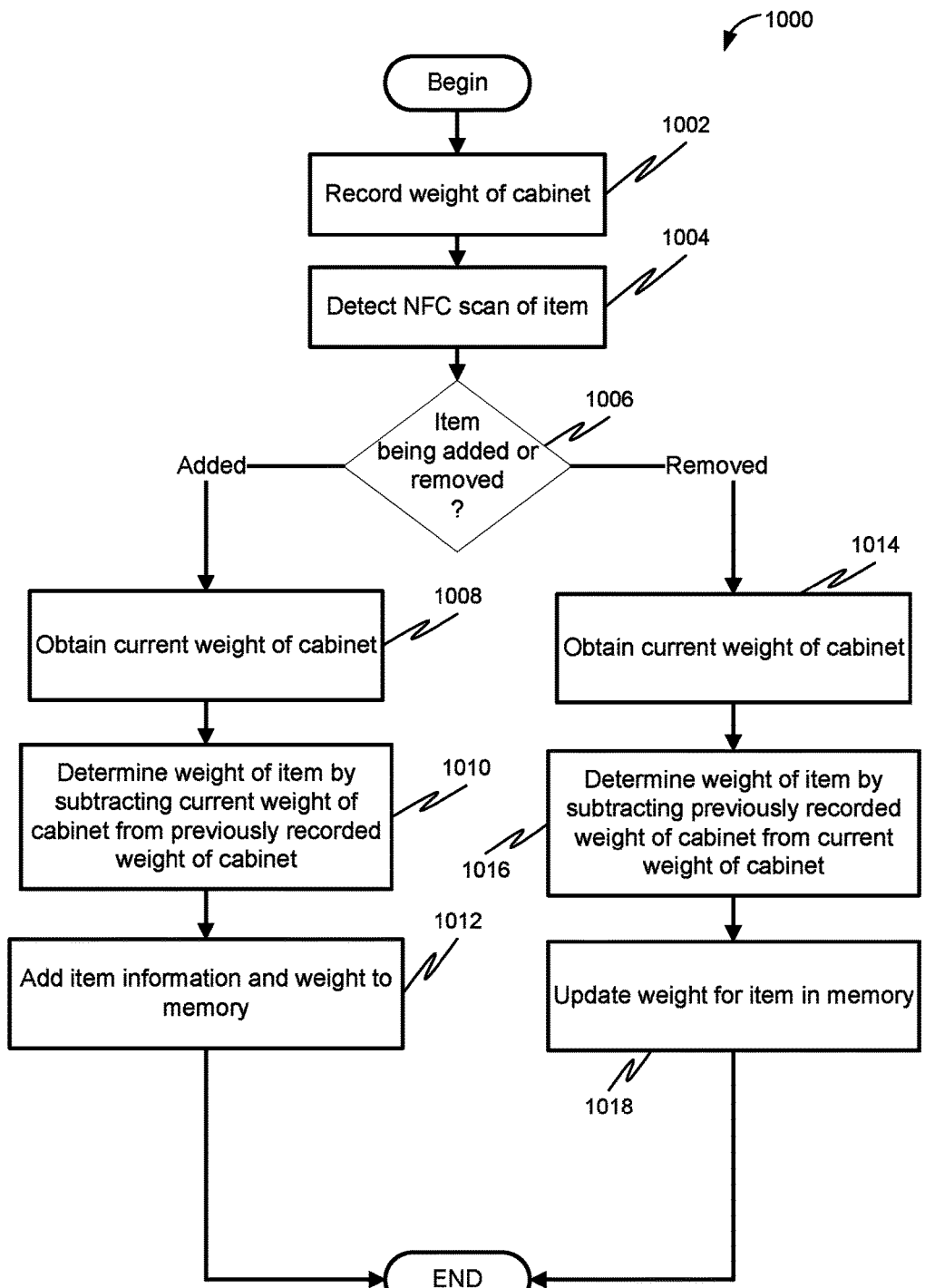
FIG. 10 is a flow diagram illustrating a method in accordance with an example embodiment.

FIG. 10 is a flow diagram illustrating a method 1000 in accordance with an example embodiment. At operation 1002, a weight of a cabinet 300 is recorded. This weight may reflect the weight of the cabinet prior to an item being added or removed. This recording may be accomplished by, for example, periodically establishing a weight measurement and recording that weight measurement. In one example embodiment, the weight may be recorded once a minute, although one of ordinary skill in the art will recognize that the period may be varied.

At operation 1004, an NFC scan of an item may be detected. This may be prompted by, for example, movement of the item over or near an NFC scanner. The movement may reflect either an item being added or an item being removed. At operation 1006, it is determined whether the item is being added or removed. This may be accomplished by, for example, comparing information about the item as scanned by the NFC scanner to an inventory list to determine whether the item has been previously "checked out". It may be assumed that if the NFC scan occurs after an item had previously been checked out, or no item information is contained in memory about the item, that the item is being added to the cabinet. Otherwise, the item is being removed.

Assuming the item is being added, at operation 1008, a current weight of the cabinet is obtained. Then, at operation 1010 the weight of the item is determined by subtracting the current weight of the cabinet from the previously recorded (e.g., at operation 1002) weight of the cabinet. At operation 1012, item information and the weight of the item can be added to memory.

If it was determined that the item is being removed, then at operation 1014, a current weight of the cabinet is obtained. Then at operation 1016, the weight of the item is determined by subtracting the previously recorded (e.g., at operation 1102) weight of the cabinet from the current weight of the cabinet. At operation 1018, the weight for the item may be updated in memory (it previously having been recorded when the item was added to the cabinet).

Figure 11:
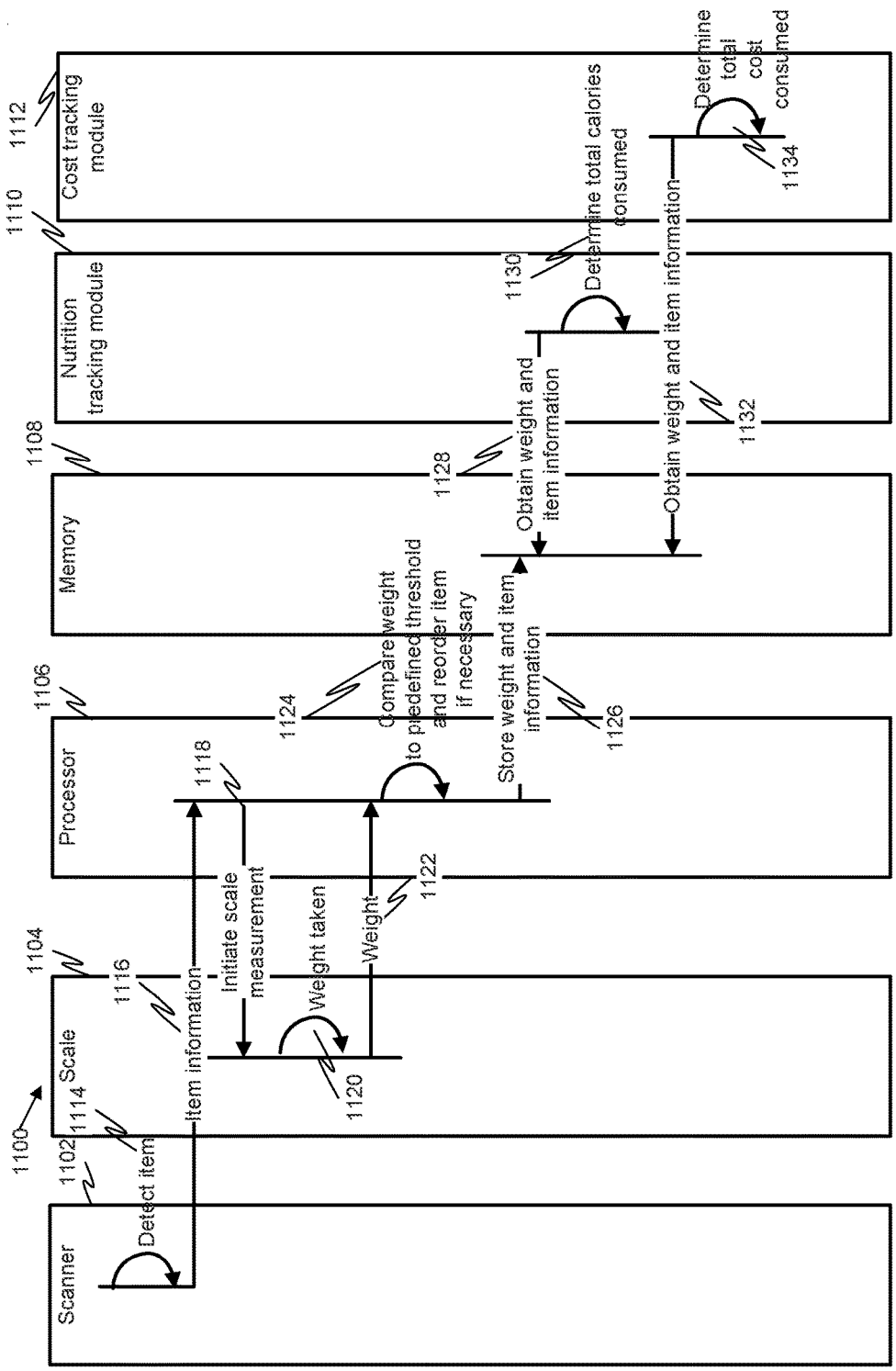
FIG. 11 is a sequence diagram illustrating a method in accordance with an example embodiment.

FIG. 11 is a sequence diagram illustrating a method 1100 in accordance with an example embodiment. This method 1100 utilizes a scanner 1102, scale 1104, processor 1106, memory 1108, nutrition tracking module 1110, and cost tracking module 1112. At operation 1114, an item is detected by the scanner 1102. At operation 1116, information about the item is passed to the processor 1106. At operation 1118, the processor 1106 initiates a scale 1104 measurement. At 1120, the scale 1104 takes a weight. This weight is passed to the processor 1106 at operation 1122. It should be noted that an additional step may then be performed by the processor 1106 involving computing the weight of the actual item, if the scale 1104 is unable to calculate that on its own. At operation 1124, the weight of the item is compared to a predefined threshold and the item is reordered, if necessary. At operation 1126, the weight and item in formation is stored in memory 1108.

At operation 1128, weight and item information is retrieved from the memory 1108 by the nutrition tracking module 1110. At operation 1130, the total calories consumed is determined by the nutrition tracking module 1110. At operation 1132, weight and item information is retrieved from the memory 1108 by the cost tracking module 1112. At operation 1134, the total cost consumed is determined by the nutrition tracking module 1110.

Figure 12:
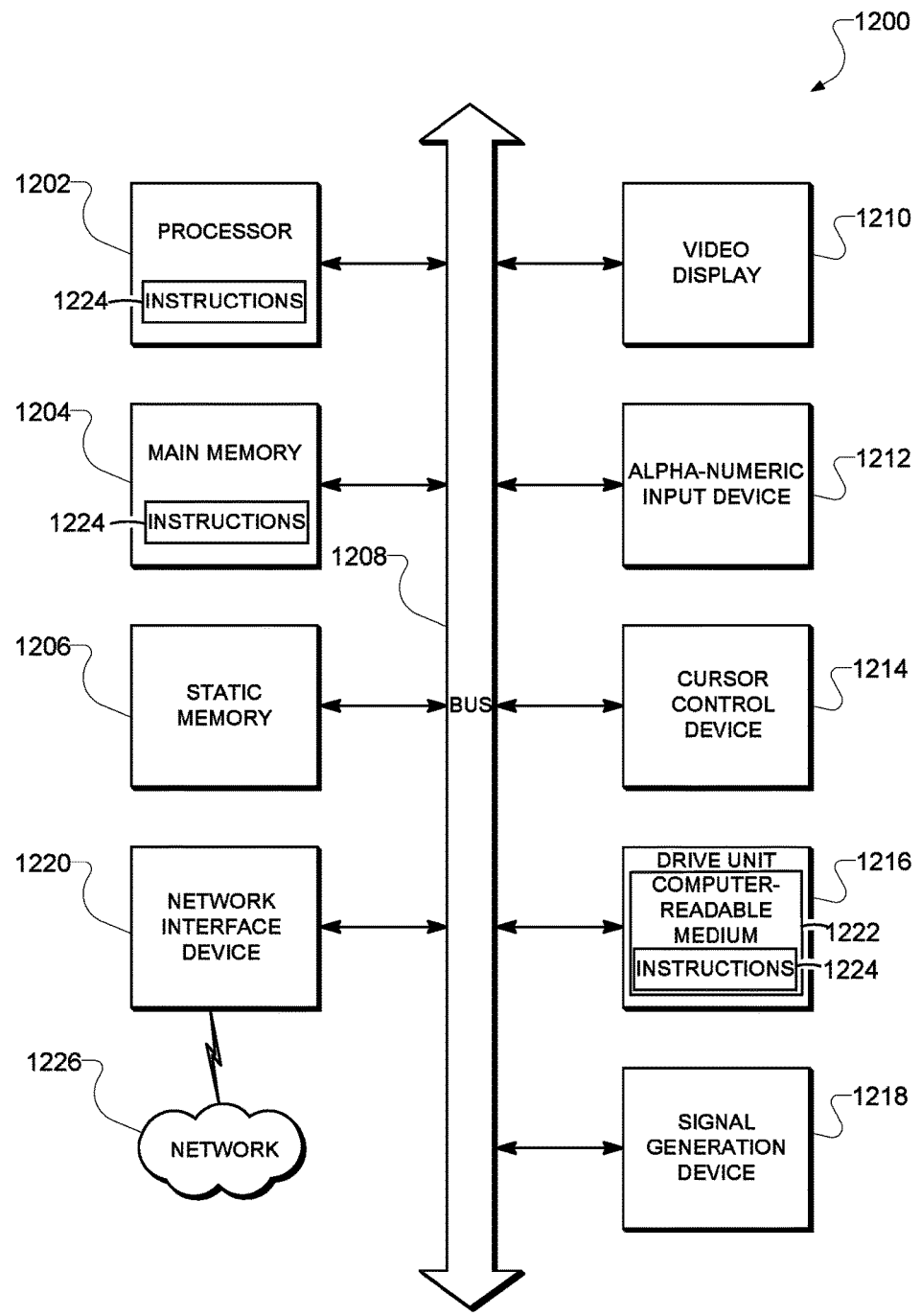
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software, a program, an application, an apples, an app, or other executable code) for causing the machine 1200 to perform any one or more of the methodologies discussed herein may be executed. In alternative embodiments, the machine 1200 operates as a standalone device or may be connected (e.g., networked) to other machines 1200. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer 314, a netbook, a set-top box (STB), a personal digital assistant (PDA), a cellular telephone, a smartphone, a web appliance, a network router, a network switch, a network bridge, or any machine 1200 capable of executing the instructions 1224, sequentially or otherwise, that specify actions to be taken by that machine 1200. Further, while only a single machine 1200 is illustrated, the term "machine" shall also be taken to include a collection of machines 1200 that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alpha-numeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media 1222. The instructions 1224 may be transmitted or received over a network 1226 via the network interface device 1220.

As used herein, the term "memory" refers to a machine-readable medium 1222 able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media a centralized or distributed database, or associated caches and servers) able to store instructions 1224. The term "machine-readable medium" shall also be taken to include any medium, or combination of multiple media, that is capable of storing instructions 1224 for execution by a machine (e.g., machine 1200), such that the instructions 1224, when executed by one or more processors 1202 of the machine 1200 (e.g., processor 1202), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 1224 may further be transmitted or received over a communications network 1226 using a transmission medium via the network interface device 1220 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions 1224 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor 1202. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1202 configured by software to become a special-purpose processor 1202, the general-purpose processor 1202 may be configured as respectively different special-purpose processors 1202 (e.g., comprising different hardware modules) at different times. Software may accordingly configure a processor 1202, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions described herein. As used herein, "processor-implemented module" refers to a hardware module implemented using one or more processors 1202.

Similarly, the methods described herein may be at least partially processor-implemented, a processor 1202 being an example of hardware. For example, at least some of the operations of a method may be performed by one or more processors 1202 or processor-implemented modules. Moreover, the one or more processors 1202 may also operate to support performance of the relevant operations in a "cloud computing" environment or as a "software as a service" (SaaS). For example, at least some of the operations may be performed by a group of computers (as examples of machines including processors), with these operations being accessible via a network 1226 (e.g., the Internet) and via one or more appropriate interfaces (e.g., an application program interface (API)).

The performance of certain of the operations may be distributed among the one or more processors 1202, not only residing within a single machine 1200, but deployed across a number of machines 1200. In some example embodiments, the one or more processors 1202 or processor-implemented modules may be located in a single geographic location (e.g., within a home environment, an office environment, or a server farm). In other example embodiments, the one or more processors 1202 or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. An apparatus comprising:
    a processor;
    a memory;
    a sensor configured to measure weight of a food item;
    a first interface configured to receive an identification of the food item;
    the processor configured to calculate how much of the food item has been consumed based on the measured weight, and to calculate, via a second interface in communication with a server, how many calories of the food item have been consumed based on the measured weight and the identification of the item; and
    the processor further configured to cause display of how many calories of the food item have been consumed to a first user.

2. The apparatus of claim 1, wherein the first interface is a wireless interface and the identification of the food item is received from a mobile device.

3. The apparatus of claim 2, wherein the mobile device obtains the identification of the food item via a scanner on the mobile device.

4. The apparatus of claim 3, wherein the scanner is a bar code scanner.

5. The apparatus of claim 2, wherein the wireless interface is a near-field communication (NFC) interface.

6. The apparatus of claim 1, wherein first interface is a wired interface and the identification of the food item is received from a scanner in the apparatus.

7. The apparatus of claim 1, wherein the first interface is further configured to receive an identification of the first user within a predetermined time period of the sensor measuring the weight of the food item, and the calories of the food item caused to be displayed include only calories associated with calories calculated from weights of the food item obtained within the predetermined period as an identification of the first user is received via the first interface.

8. The apparatus of claim 7, wherein the processor is further configured to cause display of a nutritious alternative to the food item when the number of calories calculated from weights of the food item obtained within the predetermined period as an identification of the first user is received, the nutritious alternative obtained from the server via the second interface by passing the identification of the food item to the server.

9. The apparatus of claim 1, wherein the apparatus is coupled to one or more identical apparatuses via a computer network, and wherein the processor is further configured to obtain, from the server via the second interface, one or more recipes containing ingredients that correspond to identifications of food items received by at least one of the apparatuses in the computer network and that, based upon respective measured weights, have sufficient inventory to prepare the one or more recipes.

10. The apparatus of claim 1, wherein the processor is further configured to estimate a financial cost of amount of food consumed using the calculation of how much of the food item has been consumed, identify an alternative food item having a different financial cost, and cause display of the financial cost of the amount of food consumed and the financial cost of the alternative food item.

11. The apparatus of claim 1, wherein the processor causing display of how many calories of the food item have been consumed to a first user includes causing a mobile device of the first user to display how many of the food items have been consumed.

12. A method comprising:
    measuring weight of a food item;
    receiving, via a first interface, an identification of the food item;
    calculating how much of the food item has been consumed based on the measured weight;
    calculating, via a second interface in communication with a server, how many calories of the food item have been consumed based on the measured weight and the identification of the item; and
    causing display of how many calories of the food item have been consumed to a first user.

13. The method of claim 12, wherein the calculating how much of the food item has been consumed is performed by subtracting the weight of the food item from a previous weight of the food item, as determined by identifying a weight measured within a predetermined time period of a previous receipt of the identification of the food item.

14. The method of claim 12, wherein the first interface is a wireless interface and the identification of the food item is received from a mobile device.

15. The method of claim 14, wherein the mobile device obtains the identification of the food item via a scanner on the mobile device.

16. The method of claim 15, wherein the scanner is a bar code scanner.

17. The method of claim 14, wherein the wireless interface is a near-field communication (NFC) interface.

18. The method of claim 12, wherein first interface is a wired interface and the identification of the food item is received from a scanner in the apparatus.

19. A non-transitory machine-readable storage medium having instruction data to cause a machine to perform operations comprising:

measuring weight of a food item;

receiving, via a first interface, an identification of the food item;

calculating how much of the food item has been consumed based on the measured weight;

calculating, via a second interface in communication with a server, how many calories of the food item have been consumed based on the measured weight and the identification of the item; and causing display of how many calories of the food item have been consumed to a first user.

20. The non-transitory machine-readable storage medium of claim 19, wherein the first interface is further configured to receive an identification of the first user within a predetermined time period of the sensor measuring the weight of the food item, and the calories of the food item caused to be displayed include only calories associated with calories calculated from weights of the food item obtained within the predetermined period as an identification of the first user is received via the first interface.

* * * * *